Feb. 14, 1933.    C. NORTON    1,897,764
GUIDE RAIL LUBRICATOR
Filed March 31, 1931

Clifford Norton   INVENTOR
BY   ATTORNEY

Patented Feb. 14, 1933

1,897,764

UNITED STATES PATENT OFFICE

CLIFFORD NORTON, OF SOUTH ORANGE, NEW JERSEY, ASSIGNOR TO OTIS ELEVATOR COMPANY, OF NEW YORK, N. Y., A CORPORATION OF NEW JERSEY

GUIDE RAIL LUBRICATOR

Application filed March 31, 1931. Serial No. 526,596.

The invention relates to lubricating devices and especially to devices for lubricating the guide rails of elevator installations.

It is desirable in elevator installations to reduce the friction and wear arising from the movement of the guide shoes carried by the elevator car and counterweight along the guide rails in the hatchway. Such friction and wear may be reduced by applying lubricant to the guide rails. It is usual in elevator installations to apply the lubricant by means of lubricating devices. In some instances these lubricating devices are stationary and in others they are carried by one or both of the movable bodies of the elevator system. The present invention is directed to lubricating devices carried by a movable body of an elevator system.

One feature of the invention resides in the provision of a lubricating device which insures the proper lubrication of a guide rail without waste of lubricant.

Another feature of the invention is the provision of a lubricating device of simplified construction in which the lubricant is conveyed by gravity and through a wick from a reservoir to the guide rail to be lubricated.

A third feature resides in regulating the amount of flow of lubricant through the wick by means within the oil reservoir.

A fourth feature resides in the provision of a self-closing cover for the reservoir provided with means for locking the flow-regulating means to adjusted position.

A fifth feature resides in the provision of a lubricating device which is of simple and rugged construction, which may be cheaply manufactured and installed and which is of large capacity and yet adaptable to a limited space.

Other features and advantages will become apparent from the following description and appended claims.

The invention involves a lubricating device in which the lubricant is fed by gravity from the lubricant reservoir to the guide rail through a wick. The wick controls the rate of flow of lubricant from the reservoir and paints the lubricant onto the guide rail. The rate of flow of oil through the wick is adjusted by means located within the reservoir, thereby eliminating any waste from leakage around the adjusting means. Also leakage of lubricant through the passage provided for the wick is prevented. The invention further involves providing the lubricating device with a self-closing cover having means for locking the regulating means in adjusted position.

Figure 1:
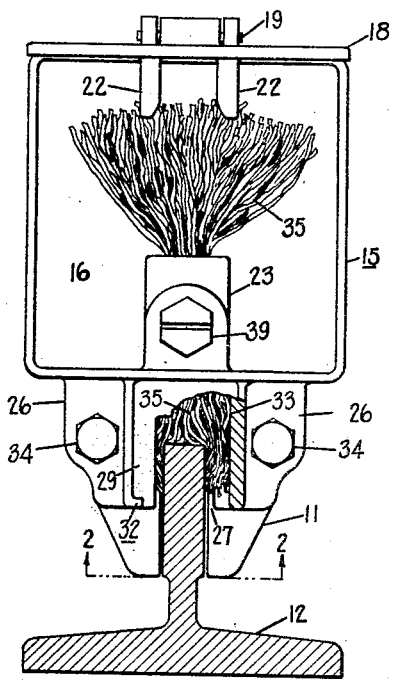
Figure 1 is a top plan view with parts in section of a lubricating device constructed in accordance with the invention, the device being shown mounted on a guide shoe, in cooperative relation to a guide rail, and with its cover plate in the elevated or open position.
Figure 3:
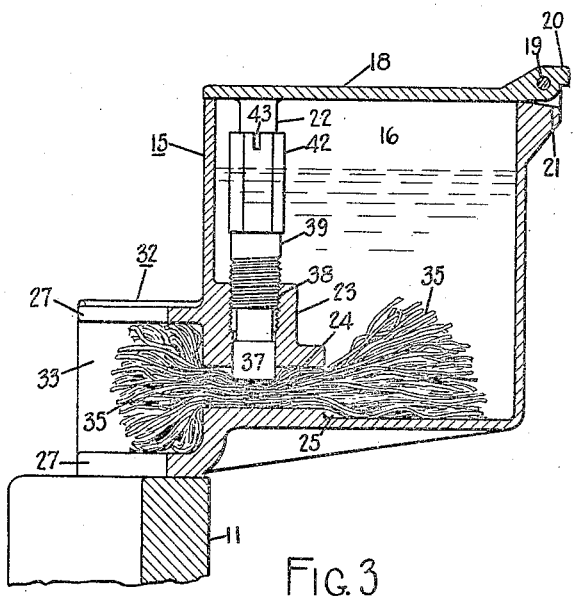
Figure 3 is a central vertical section taken on the line 3—3 of Figure 2, the guide rail not being shown.
Figure 2:
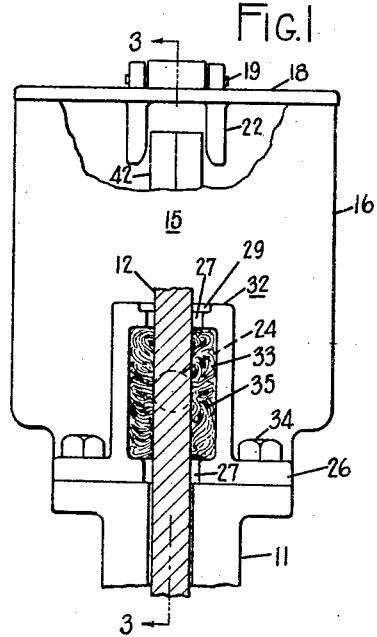
Figure 2 is a vertical section taken on the line 2—2 of Figure 1, a portion of the lubricant container being broken away to disclose parts therein.

Referring to the drawing, an embodiment of the lubricating device, designated as a whole by the numeral 15, is illustrated as mounted on a guide shoe 11 for a movable body in the elevator hatchway. The guide shoe is shown in outline and in its position for cooperating with guide rail 12.

The lubricating device, according to the preferred arrangement, comprises a container 16 which forms a lubricant reservoir. The container is open at the top and may be a casting of aluminum or aluminum alloy. An internally disposed protuberant portion 23 is formed integral with the front wall and bottom of the container. An aperture 24 extends through the portion 23 at a point slightly above the floor of the reservoir and parallel thereto. This aperture extends to the application chamber 33 of a distributor 32 formed on the container. This distributor is open at the front and is provided with channels 27 in the top and bottom to admit the guide rail 12.

A wick 35, preferably in the form of a plurality of corded strands of fibrous material, extends from the reservoir, through the aperture 24, into the application chamber 33. This wick is of sufficient length to extend well into the reservoir and into the application chamber 33 where the strands are flared out and contact with the guide rail 12.

An aperture 38 extends downwardly through the portion 23 into the aperture 24. The upper end of this aperture is threaded to receive a regulating screw 39. The lower end of the regulating screw is formed with a flat cylindrical nose 37 of substantially the same diameter as that of aperture 24. The lower portion of aperture 38 is of a diameter such as to provide a close fit for the nose 37. The upper end 42 of the regulating screw is hexagonal in form and is provided with a slot 43.

A cover 18 is provided for the container, being hinged thereto at 19. Lugs 22 depend from the cover 18 at right angles thereto for locking the regulating screw in adjusted position. The pin for the hinge 19 is offset relative to the plane of the cover 18 and a lug 20 on the cover cooperates with a lug 21 on the container to prevent the cover from passing a vertical position.

Webs 26 extend from the sides of the distributor and are provided with apertures to receive the screws 34 for securing the lubricator to the guide shoe.

In operation, the lubricant passes from the reservoir through the wick to the guide rail. The lubricant is fed by gravity, the wick acting as a conveyor of the lubricant. The wick is made up of sufficient strands of fibrous material to fill aperture 24 so that the wick also acts as a stopper to prevent leakage of the lubricant. As the movable body which carries the lubricator moves up and down the hatchway, the wick applies the lubricant to the face and sides of the guide rail, the guide shoe assisting the wick in distributing the lubricant to the sides of the rail. The wick acts in the manner of a paint brush in applying the lubricant, i. e., it acts to apply a sufficient coat of lubricant to the rail and thereafter applies no more lubricant until further lubricant is required. In this manner, waste of the lubricant is prevented.

The amount of lubricant in the portion of the wick in the application chamber may be regulated by adjusting screw 39. This screw is tightened down to compress the wick sufficiently to prevent an excess supply of lubricant to the applicating end of the wick. The regulating screw, once adjusted, is locked in adjusted position by the lugs 22 on the cover 18.

The arrangement of the nose 37 of the regulating screw to be of substantially the same diameter as that of the aperture 24 prevents any leakage of lubricant around the nose when the wicking is compressed. The arrangement of the regulating screw within the container prevents loss of lubricant by leakage through the aperture provided for the regulating screw.

The regulating screw may be locked in adjusted position in a manner other than that illustrated but it is preferred to utilize locking means associated with the cover 18. The arrangement of the lugs 20 and 21 prevents the cover from passing beyond the vertical position when lifted. This arrangement, together with the offset hinge pin, causes the cover to return to closed position when released. The lugs 22 on the cover prevent the full closing of the cover unless the regulating screw is in position to be straddled by the lugs, thereby assuring the locking of the regulating screw in adjusted position when the lubricator cover is closed.

In practice the heavier grades of lubricating oils are employed in new installations. Lighter grades of oils are later substituted and regulation of the amount of flow of lubricant through the wick 35 is effected by simply turning down the screw 39 to obtain the proper adjustment for the lighter bodied oils.

The aperture 24 is arranged preferably slightly above the bottom of the lubricator container to provide a sediment basin 25. A basin 29 is also provided on top of the distributor to receive any lubricant which might escape from the application chamber and return it thereto.

The arrangement of the distributor immediately adjacent the container permits the use of a large oil container within a limited space. This is particularly desirable in view of the fact that the space for lubricators mounted on guide shoes is sometimes quite limited. It is preferred to mount the lubricator on the guide shoe, not only from the standpoint of convenience of installation, but also because the guide shoes are usually pivoted so as to readily follow the guide rails, thereby assuring the proper position of the lubricator with respect to the guide rail at all times.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A lubricating device for a guide rail for a movable body of an elevator installation comprising, a lubricant container carried by said movable body, a cover for said container, means for conveying lubricant from the container to the guide rail, adjustable means within the container for regulating the amount of flow of lubricant through said conveying means, and means for preventing the cover from closing except when said regulating means is in certain adjusted positions.

2. A lubricating device for a guide rail for a movable body of an elevator installation comprising, a lubricant container carried by said movable body, a cover for said container hinged to one side thereof, a wick for conveying lubricant from the container to the guide rail, adjustable means within the container for regulating the amount of flow of lubricant through said wick, and means depending from said cover for cooperating with said regulating means to lock the regulating means in adjusted position.

3. A lubricating device for a guide rail for a movable body of an elevator installation comprising, a lubricant container carried by said movable body, means for conveying lubricant by gravity from the container to the guide rail, adjustable means within the container for regulating the amount of flow of lubricant through said conveying means, a cover for said container, said cover being biased to closed position, and means for preventing the cover from closing except when said regulating means is in certain adjusted positions.

4. A lubricating device for a guide rail for a movable body of an elevator installation comprising, a lubricant container carried by said movable body, a wick for conveying lubricant by gravity from the container to the guide rail, adjustable means within the container for regulating the amount of flow of lubricant through said wick, a cover for said container, said cover being biased to closed position, and means associated with said self-closing cover for locking said regulating means in adjusted position.

5. A lubricating device for a guide rail for a movable body of an elevator installation comprising, a lubricant container carried by said movable body, said container having an aperture for feeding lubricant under the action of gravity from the container to the guide rail, a wick consisting of a plurality of strands of fibrous material extending from within said container through said aperture from the end of which they are flared out to contact with the face and sides of said guide rail, said wick acting to convey said lubricant to and apply it to the guide rail, a regulating screw within said container for adjustably compressing said wick in said aperture to regulate the amount of lubricant conveyed to the flared end of the wick, said screw in compressing said wick closing the remaining portion of said aperture, a self-closing cover for said container, and means depending from said cover for cooperating with the head portion of said screw to lock the screw in adjusted position.

In testimony whereof, I have signed my name to this specification.

CLIFFORD NORTON.